(12) United States Patent
Svedloff (10) Patent No.: US 7,047,318 B1
(45) Date of Patent: May 16, 2006

(54) METHOD AND APPARATUS FOR CREATING AND DEPLOYING WEB SITES WITH DYNAMIC CONTENT

(75) Inventor: George Svedloff, Sunnyvale, CA (US)

(73) Assignee: Softface, Inc., Sunnyvale, CA (US)

( * ) Notice: Subject to any disclaimer, the term of this patent is extended or adjusted under 35 U.S.C. 154(b) by 717 days.

(21) Appl. No.: 09/839,589

(22) Filed: Apr. 20, 2001

(51) Int. Cl.
G06F 15/16 (2006.01)

(52) U.S. Cl. .................. 709/246; 709/213; 709/217; 709/223

(58) Field of Classification Search ........... 709/202, 709/205, 223, 224, 225, 226, 229, 238, 213, 709/217
See application file for complete search history.

(56) References Cited

U.S. PATENT DOCUMENTS

| | | | | |
|---|---|---|---|---|
| 6,128,655 | A * | 10/2000 | Fields et al. ............... | 709/219 |
| 6,226,675 | B1 * | 5/2001 | Meltzer et al. ............ | 709/223 |
| 6,286,043 | B1 * | 9/2001 | Cuomo et al. ............. | 709/223 |
| 6,292,936 | B1 * | 9/2001 | Wang ....................... | 717/115 |
| 6,313,835 | B1 * | 11/2001 | Gever et al. ............... | 345/846 |
| 6,415,335 | B1 * | 7/2002 | Lowery et al. ............. | 710/5 |
| 6,507,856 | B1 * | 1/2003 | Chen et al. ................ | 715/513 |
| 6,578,192 | B1 * | 6/2003 | Boehme et al. ............ | 717/115 |
| 6,718,515 | B1 * | 4/2004 | Conner et al. ............. | 715/509 |
| 6,779,152 | B1 * | 8/2004 | Conner et al. ............. | 715/509 |
| 6,920,607 | B1 * | 7/2005 | Ali et al. .................. | 715/501.1 |

* cited by examiner

*Primary Examiner*—Ario Etienne
*Assistant Examiner*—Sargon Nano
(74) *Attorney, Agent, or Firm*—Blakely, Sokoloff, Taylor & Zafman LLP (57) ABSTRACT

A system for developing and deploying web pages that have dynamic content is disclosed. First, a graphic artist creates a template HTML file that will provide the visual appearance of a dynamic web page. The template HTML file is embedded with identifier tags that identify locations where dynamic content should be inserted. A programmer then creates a program for manipulating a Document Object Model (DOM) representation of the HTML file to add desired dynamic content. The template HTML file and dynamic content program are then deployed to a special server system that serves the template HTML by executing the associated dynamic content program. When the server system receives a request for the template HTML file, the server first creates a clone of a Document Object Model (DOM) of the template HTML file and executes the dynamic content program to manipulated the DOM representation. The server then transforms the manipulated DOM representation into HTML and delivers the generated HTML to the client system that made the request.

19 Claims, 6 Drawing Sheets

| Type of web site modification. | Steps to effectuate web site modification with Enhydra. | Steps to effectuate web site modification with present invention. |
|---|---|---|
| Simple change to static template HTML file. | 1) Change the template HTML file.<br>2) Recompile the changed template HTML file with XMLC to create foo.java<br>3) Compile foo.java into the foo.class;<br>4) Link the changed foo.class with myclass.class<br>5) Deploy linked file to the server.<br>6) Restart the server. | 1) Change the template HTML file.<br>2) Deploy changed template HTML file to the server. |
| Deletion of existing dynamic element. | 1) Change the template HTML file to delete element.<br>2) Recompile the changed template HTML file with XMLC to create foo.java<br>3) Compile foo.java into the foo.class;<br>4) Revise the myclass.java to remove deleted dynamic content portions<br>5) Compile the myclass.java file into myclass.class<br>6) Link the changed foo.class with the myclass.class<br>7) Deploy linked file to the server.<br>8) Restart the server. | 1) Change the template HTML file to delete dynamic element.<br>2) Deploy changed template HTML file to the server. |
| Addition of a new dynamic element. | 1) Change the template HTML file to add element.<br>2) Recompile the changed template HTML file with XMLC to create foo.java<br>3) Compile foo.java into the foo.class;<br>4) Revise the myclass.java to add new dynamic content<br>5) Compile the myclass.java file into the myclass.class;<br>6) Link the changed foo.class with the myclass.class<br>7) Deploy linked file to the server.<br>8) Restart the server. | 1) Change the template HTML file to add element.<br>2) Revise the myclass.java to add new dynamic content changes.<br>3) Compile the myclass.java file into the myclass.class;<br>4) Deploy changed foo.class and changed template HTML file to the server.<br>5) Restart the server. |

Figure 6

METHOD AND APPARATUS FOR CREATING AND DEPLOYING WEB SITES WITH DYNAMIC CONTENT

FIELD OF THE INVENTION

The present invention relates to the field of Internet communication. In particular, the present invention discloses an arrangement and methods for creating and deploying web sites with dynamic content.

BACKGROUND OF THE INVENTION

The Internet is a global interconnection of computer networks that share a common set of data communication protocols. Most computers on the global Internet use the Transport Control Protocol layer and the Internet Protocol layer commonly referred to together as the TCP/IP standard protocols. By sharing a set of nonproprietary well-defined data communication protocols, the Internet allows almost any computer system on the Internet to communicate with any other computer system on the Internet. Initially, most Internet users used the Internet for electronic mail (email), file transfers, discussion groups, and email using the simple mail transport protocol (SMTP), the file transfer protocol (FTP), and the network news transport protocol (NNTP), respectively.

One particular transport protocol, known as the HyperText Transport Protocol (HTTP), was created for sharing HyperText Markup Language (HTML) documents as well as other types of documents that are referenced by an HTML document. The creation of HTTP and HTML enabled Internet users to easily create media-rich documents that could easily be shared. The media-rich documents are "browsed" using an HTTP/HTML browser program. Each shared HTML document can refer to other HTML documents using hypertext links (also known as hyperlinks). By linking together HTML documents located on various servers throughout the world using embedded hyperlinks, a "World Wide Web" (WWW) of interconnected hypertext documents was created. Due to the simple, yet very powerful nature of HTML and HTTP, the World Wide Web (WWW) portion of the Internet has grown into the most popular form of Internet communication.

The modern HTML and HTTP standards include provisions for handling two-way communication. Specifically, an HTTP server may send an HTML "form" to a user's client browser program. The client browser program may present a user with an HTML "form" that contains parameters that can be filled-in by the user. Once filled in, the browser program may send back the user-completed parameters to the server. The server system may then use the parameters entered by the user. Modern web servers also generate dynamic content. Dynamic content is content that is created "on the fly." For example, to verify the entries in an HTML form, a web server may generate a web page that displays the user-entered parameters back to the user.

With these interactive and dynamic HTML and HTTP features, companies have created commercial WWW sites that can perform financial transactions. For example, a retailer may create a set of HTML documents that describe various products available for sale. The retailer may then provide HTML form documents that allow a user to specify a desired product, provide a shipping address, and provide a credit card to pay for the desired product. To verify a particular transaction, the web site must generate dynamic web pages that contain transaction specific information such as the purchaser's address and product selection. With such commerce based Internet web sites, the Internet has become the new frontier of retail commerce.

Initially, such interactive and dynamic Internet web sites were created with the common gateway interface (CGI). Using a common gateway interface, a web server calls an external application as needed to perform desired processing. Using a common gateway interface for processing is not efficient since an external application must be loaded, executed, and unloaded for each user request. To provide greater efficiency, Netscape and Microsoft introduced the NSAPI and ISAPI interfaces, respectively. These interfaces allowed for the creation of in-process plug-ins that could do the same things as CGI. However these proprietary technologies were not interoperable.

Java Server Pages and Java "Servlets" were later introduced as another method of creating interactive and dynamic web sites. Java Server Pages (JSP) were created to allow an Internet server to directly perform needed processing for an interactive web site. A Java Server Page is an HTML document that is mixed with Java code to provide interactive features. Java Server Pages may be compiled into Java servlets that are directly executed by an Internet server to provide dynamic content.

The intermixed web page design HTML code and Java code in a Java Server page has been a source of difficulty in web site creation projects. It is not clear as to whether an HTML designer or a Java programmer controls the code. Java Server Page code is often mishandled by third-party web authoring tools. Furthermore, the flow of control of the Java program in a JSP is obscured by the HTML code. Thus, it was desirable to have a different method of creating interactive web sites that does not use such a confusing intermix of two different types of code.

The Enhydra project (http://www.enhydra.org/) was created to offer a different development system for creating interactive web sites having dynamic content. The Enhydra system operates by inserting less obtrusive dynamic content tags into web page HTML to provide dynamic content to otherwise static web pages. The dynamic content tags specify wherein dynamic content must be provided by program code. A programmer then writes separate application Java code to provide the desired dynamic content for the web page portions identified with dynamic content tags. To link the static web page HTML and the Java code that provides dynamic content, the web page HTML is compiled with a special XMLC compiler that outputs web page Java code that can be used to regenerate the designed web page. Then, that generated web page Java code and programmer-written application Java code are compiled and linked together to create a final Java Servlet that is deployed on a server.

Although the Enhydra system provides a better separation of design (HTML) from logic (Java interactive code), the Enhydra system has its own problems. One significant problem with the Enhydra system is that the design and deployment process is long and nontrivial. Every change to the web page design requires a recompilation of the web page with the XMLC compiler and relinking with the programmer-written dynamic content Java code. Thus, it is not easy to quickly make adjustments to an Interactive Web site developed with the Enhydra system. Thus, it would be desirable to have a development system for interactive web sites that allows such interactive web sites to be easily created and edited.

SUMMARY OF THE INVENTION

The present invention discloses a new system for developing and deploying web pages that have dynamic content. In the system of the present invention, a graphic artist creates a template web page HTML file that will provide the visual appearance of a dynamic web page. The template web page HTML file is embedded with identifier tags that identify locations where dynamic content should be inserted. A programmer creates a dynamic content program for generating desired dynamic content for the sections of the web page identified with dynamic content identifier tags. The template web page HTML file and dynamic content program are then deployed to a special server system that serves the template web page HTML by executing the associated dynamic content program.

When the server system receives a request for the template web page HTML file, the server first creates a clone of a Document Object Model (DOM) of the template web page HTML file. Next, the server executes the dynamic content program associated the template web page HTML file. The dynamic content program manipulates the sections of the Document Object Model (DOM) of the template web page having the dynamic content identifier tags. After the document object model of the template web page has been manipulated by the dynamic content program, the server then transforms the manipulated document object model into web page HTML and delivers the web page HTML to the client system that made the initial request.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

Methods and arrangements for creating interactive web sites that are easy to modify are disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with specific references to the HyperText Markup Language (HTML). However, the same techniques can easily be applied to other types of markup languages such as XML or WML.

Interactive Internet Web Sites

Figure 1:
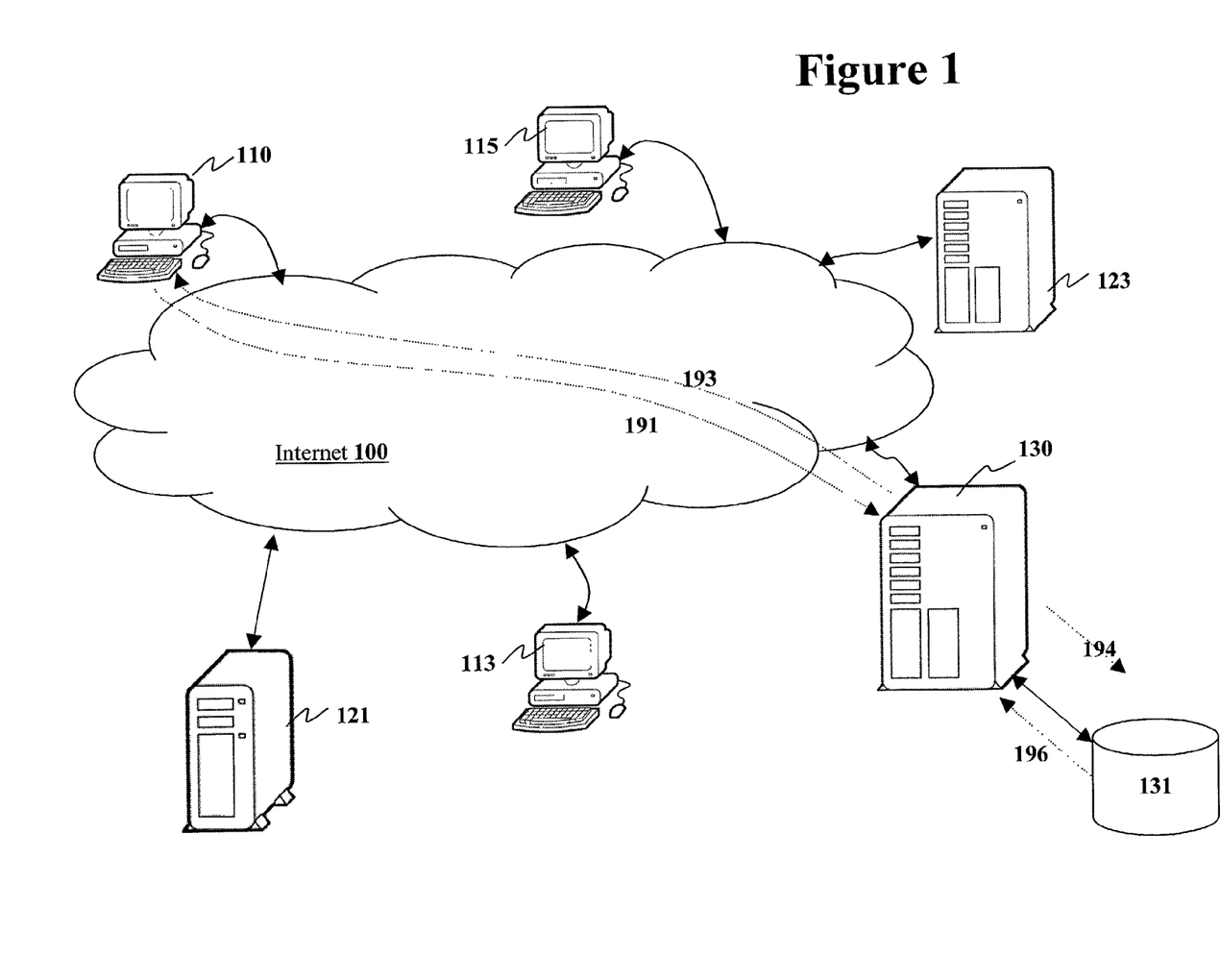
FIG. 1 illustrates a conceptual diagram of the Internet including several client systems and several server systems.

Internet based commerce, often known as ecommerce, has been one of the fastest growing retail sectors in the late twentieth century. FIG. 1 illustrates a conceptual diagram of a typical ecommerce system on the Internet 100. Referring to FIG. 1, there are a number of client computer systems such as personal computer 110, 113, and 115 coupled to the Internet 100. The client computer systems typically use a web browser program such as Netscape's Navigator or Microsoft's Internet Explorer to access web sites on server systems such as web servers 121, 123, and 130.

In simple static web site browsing, a web browser program on a client computer system 110 requests information from a web server 130 along dataflow 191 using an HTTP "GET" request. The web server 130 responds to the "GET" request by returning the requested information to client computer system 110 along dataflow 193.

To allow ecommerce transactions to take place, a web site must be made interactive and dynamic. An interactive web site is one that is able to accept input from the visitor. A dynamic web site is one that displays different information depending on the particular circumstances. For example, to initiate an ecommerce transaction, client computer system 110 may need to request the purchase of a specific item from ecommerce server 130. One very common method of performing such an action is to present the user of client computer system 110 with an interactive HTML "form" that may be filled in. Once the form is filled in, the client computer system 110 issues an HTTP "POST" request to send the user inputted parameters from the client computer system 110 to the ecommerce server 130 along dataflow 191. (However, it should be noted that an HTTP "GET" requests may also be used.) The "POST" request may contain information related to the desired purchase transaction such as a product item number, a consumer mailing address, and credit card information. The ecommerce server 130 may then generate a dynamic web page that contains the inputted information such that the user may verify the transaction.

An ecommerce site uses programs to parse the consumer and transaction information from a "POST" request. For example, programs at the ecommerce site may check an inventory and/or credit database 131 using the information contained in the "POST" request to determine if the purchase transaction should be approved. Originally, this was typically performed using a Common Gateway Interface (CGI) script to process the information in the "POST" request. Many current systems use technologies such as servlets, Java Server Pages (JSP), or Active Server Pages (ASP). After the processing, the ecommerce web site then informs the consumer if the consumer's transaction was approved by returning information along dataflow 193.

As Internet retailing has grown rapidly, almost every traditional retailer has been pressured to offer some type of Internet based commerce system in order to compete with a large contingent of upstart "Internet only" retailers. This heavy demand for ecommerce sites has created a demand for good interactive web site development tools that allow web sites to be created that accept input and can dynamically generate response pages.

Existing Interactive Web Page Development Tools

As set forth in the background, interactive Internet web sites were initially created with the common gateway interface (CGI) scripts. Using the common gateway interface, a web server calls an external application as needed to perform desired processing. Using the common gateway interface for processing is not efficient since an external application must be loaded, executed, and unloaded for each user request.

Java Server Pages

To provide greater server efficiency, Java Server Pages were introduced. Java Server Pages (JSP) were created to allow a server to directly perform needed processing for an interactive web site. A Java Server Page is an HTML document that is mixed with Java code to provide interactive features. Java Server Pages are compiled into "servlets" that are executed on a server to provide interactive content. The following code is a short Java Server page:

```
<HTML>
<%@ page language="Java"
    imports="com.wombat.JSP.*" %>
<H1>Welcome</H1>
<p>Today is </p>
<jsp:useBean id="clock"
    class="calendar.jspCalendar" />
<UL>
<LI> Day: <%=clock.GetDayOfMonth() %>
<LI> Year: <%=clock.Year() %>
</UL>
<% if (Calendar.getInstance().get(Calendar.AM_PM)
        = Calendar.AM { %>
Good Morning
<% } else { %>
Good Afternoon
<% } %>
</HTML>
```

As illustrated in the preceding sample code, the Java Server Page is a confusing mix of HTML code and Java code. In a development environment, it is not clear who would be the "owner" (the responsible party) for such code, web site HTML designers or web site programmers. The mix of HTML and Java in a Java Server page is often mishandled by third-party web authoring tools used to design web pages. Furthermore, the flow of control of the Java program is obscured by the HTML code. Due to these many problems, many interactive web site developers have rejected using the mixed HTML and Java code format of Java Server Pages since it mixes the HTML domain of graphic artists with the interactive programming domain of programmers.

Enhydra Approach

In an alternate approach, the Enhydra project (http://www.enhydra.org/) developed a different interactive web site development system that sought to keep web page HTML design separate from the program code to generate the dynamic parts of a web site. The Enhydra system operates by inserting tags into web page HTML to provide reference points for dynamic content provided by executable code. Specifically, the identifier tags specify where dynamic content needs to be added to the web page HTML. For example, the following HTML code includes a <SPAN> tag that is used to specify a section of the web page HTML code that is to be replaced with dynamic content:
```
<HTML>
<CENTER>
The current time is <SPAN id="Time"> Jan. 1, 2000 :12:00:00</SPAN>
</CENTER>
</HTML>
```

To use Enhydra based HTML code in a dynamic web site, the developer compiles the template web page HTML code with a compiler known as an "XMLC" compiler that generates a Java program for rendering the designed the web page. However, the sections of the Java program that are identified with a dynamic content identifier value are associated with function calls to code that generate dynamic content. For example, in the above code, the <SPAN id="Time">Jan. 1, 2000 :12:00:00</SPAN> section of code is associated with a function call to "getTextTime( )" that allows the text for that section to be set with a call to the getTextTime( ) function. Thus, the sample data "Jan. 1, 2000 :12:00:00" is never actually displayed other than when test viewing the Enhydra template HTML file. Instead, separate dynamic content Java code is written to call the getTextTime( ) and insert the desired dynamic content.

To combine the web page Java code from the XMLC compiler and the dynamic content Java code, the web page Java code and the dynamic content Java code are each compiled and then linked together to create a final Java class "servlef" for the web page. The Java Servlet is deployed on a server.

Figure 2:
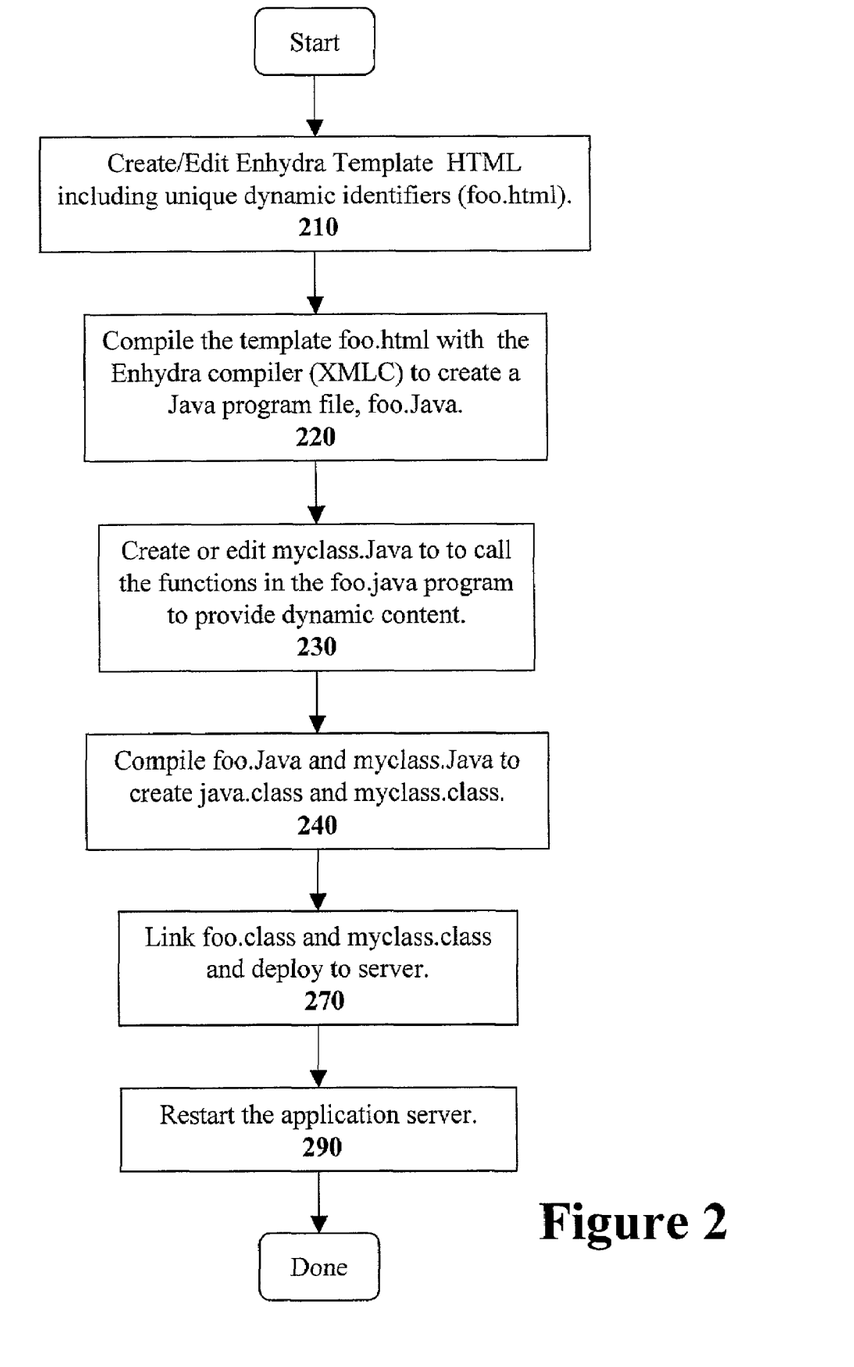
FIG. 2 illustrates a flow diagram describing how an Enhydra based interactive web site is developed and deployed.

FIG. 2 illustrates a flow diagram of the steps required to develop and deploy a dynamic web page using the tools of the Enhydra system. At step 210, the web site designers create a template HTML file, foo.html that contains the basic design of a dynamic web page. The sections of the web page that are to be supplemented with dynamic content are marked with unique dynamic content identifier tags such as "id=FirstName". Note that the dynamic content identifier tags must be unique in the Enhydra system in order to have unique function call names. Thus, even if the same dynamic content is to be used at different places on the same page, different dynamic content tags are needed. For example, if the first name of a user is referred to twice in the same page, then the template HTML filed may refer to "id=FirstName1" and "id=FirstName2".

The web page template HTML file is then compiled at step 220 with the Enhydra XMLC compiler to convert the template HTML file (named foo.html in this example) into a Java program (foo.java in this example). As previously set forth, the generated foo.java file will include several functions that should be called in order to have dynamic content provided to the template web page.

Next, at step 230, a programmer writes a Java program, myclass.java, to support the marked dynamic content sections of the Template HTML file. The myclass.java Java program should call all the functions created by the unique dynamic content identifier tags to provide the dynamic content. The myclass.java Java program may access back-end databases to obtain information for the dynamic content portions of the web page. When all the dynamic content functions have been called, the myclass.java java program should call a special routine in the foo.java to output the final web page.

To deploy the created java files, the web page foo.java program and the dynamic content myclass.java program are compiled at step 240 to generate executable foo.class and myclass.class files, respectively. The executable foo.class and myclass.class files are then deployed to the server at step 270. Finally, the server is restarted at step 290 so that the new class files are recognized and loaded.

The Enhydra development system of FIG. 2 manages to provide a separation between the graphic designer created portions and the programmer created portions. Specifically, the graphic designer can use any third-party web design tools to create the template foo.html file that determines the overall appearance of the web page. Similarly, the programmer can use any desired programming tools to create the myclass.java program that creates dynamic content. However, the overall development and deployment process of an Enhydra based project requires a large number of steps such that any change to the web page design requires several steps. For example, if dynamic content needs to be added to web page layout, then the designer and programmer must:

(1) Make the changes to the template web page HTML file (foo.html);
(2) Compile the web page HTML file (foo.html) with the XMLC compiler to generate the foo.java file;
(3) Revise the myclass.java to implement required changes to the dynamic content portions;
(4) Compile the web page foo.java file into the foo.class;
(5) Compile the myclass.java file into the myclass.class;
(6) Link the changed foo.class with the changed myclass.class dynamic content routines and deploy the linked program to the server; and
(7) Restart the server.

Due to this long and nontrivial development cycle, the Enhydra web page development system is not ideal for developing dynamic web sites that are often changed. It would therefore be desirable to have a more efficient system for dynamic web site development.

New Dynamic Web Page Development Tools

To provide a better development environment for dynamic web site development, the present invention introduces a dynamic web site development that does not require such a complicated and long development cycle. Specifically, the system of the present invention does not compile web pages into Java classes that need to be called form other Java classes. By eliminating the steps of compiling and linking of web page designs, the system of the present invention allows web sites to be more quickly deployed and modified. System built according The present invention instead uses the Document Object Model to dynamically create web pages.

Figure 3:
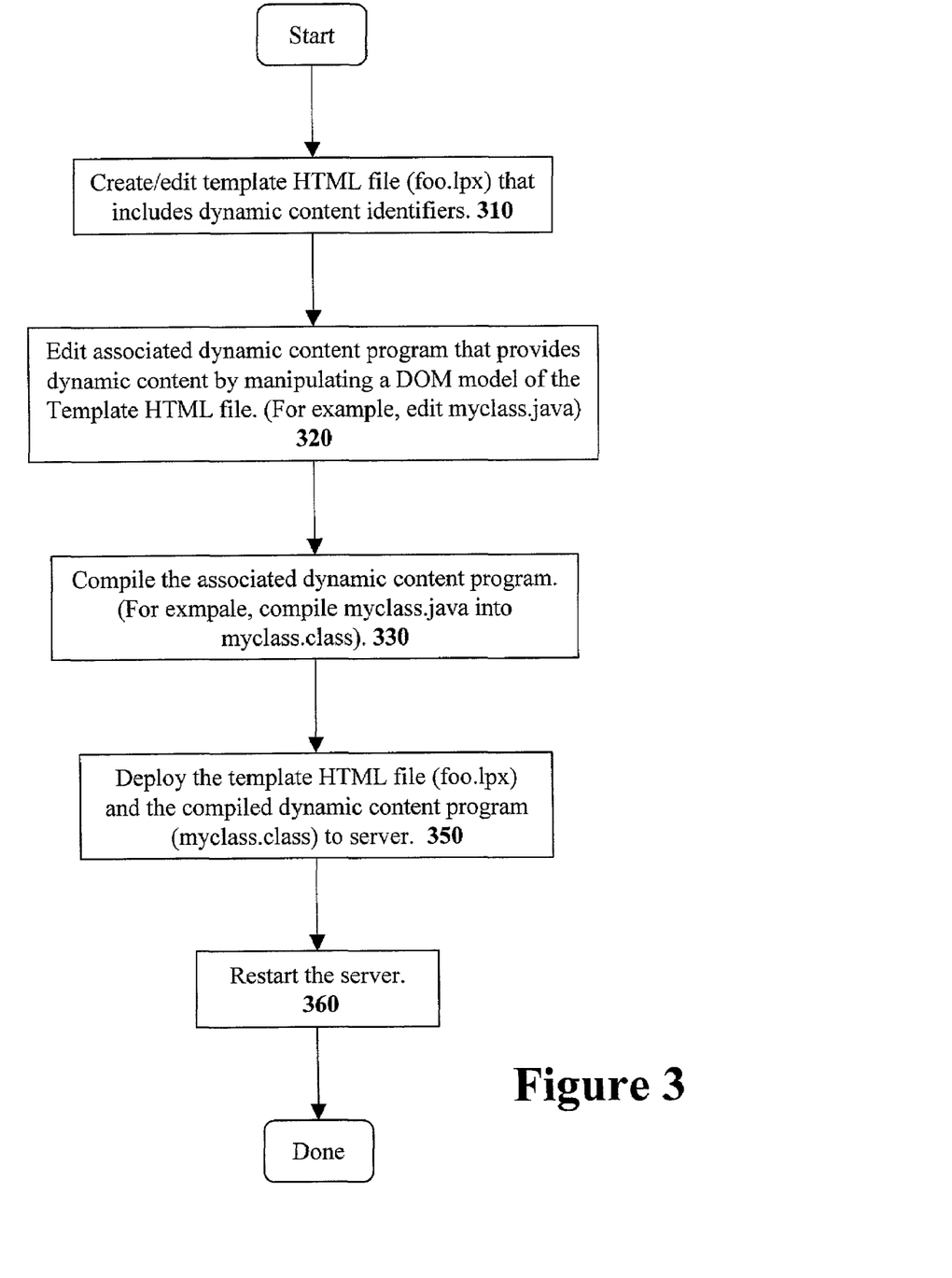
FIG. 3 illustrates a flow diagram describing how to develop and deploy a web site using the teachings of the present invention.

FIG. 3 illustrates a flow diagram development process for a dynamic web site according to the teachings of the present invention. First, at step 310, a graphic designer creates a web page template HTML file that includes identifier designations for dynamic content portions. The template HTML file (named foo.lpx in this example) is designated with an "lpx" extension to distinguish it from ordinary HTML files (that have an "html" or "htm" extensions). The template HTML lpx file is the same as ordinary HTML files except that it contains innocuous dynamic content identifier tags (in this case, "id" attributes for any HTML element) that specify where dynamic content should be provided. Thus, the lpx web page design code can be created and edited with any third party HTML editor such as Adobe's PageMill, Macromedia's Dreamweaver, or Microsoft's Front Page.

Next, at step 320, a programmer creates an associated program (named myclass.java in this example) that will provide the dynamic content sections of the web page lpx file. As set forth above, each section in the lpx web page file that has a dynamic content identifier tag designation. When the lpx web page file is deployed to a server according to the teachings of the present invention, that lpx web page file will be parsed into a Document Object Model (DOM) representation. The associated program is coded such that it locates the dynamic content identifier tags in the Document Object Model (DOM) representation and then manipulates those sections of the Document Object Model (DOM) representation to provide the desired dynamic content into the web page. Although the present invention has been disclosed with reference to a Java program, any type of program that can modify a Document Object Model (DOM) representation can be used. Details about the Document Object Model (DOM) can be found at the web site: http://www.w3c.org/DOM/. Thus, the programmer may use any familiar program editing and development tools to created the interactive program code.

At step 330, the programmer's dynamic content program code is compiled. In a Java-based environment, the java program source code is compiled into a java class file. In the example of FIG. 3, the myclass.java program is compiled into a Java byte code named myclass.class.

The compiled myclass.class program and foo.lpx HTML code are then deployed to a special interactive server system program at step 350. Note that the template HTML web page (foo.lpx) did not need to be compiled before it is deployed to the server system. Finally at step 360, the server system is restarted so that it will recognize the new interactive myclass.class program code.

Server Program

As noted in the previous section, the system of the present invention does not compile the template web page design HTML into Java programs (as done by Java Server Pages and Enhydra). Instead, the system of the present invention parses the template HTML web page (foo.lpx) into a document object model (DOM) representation that may reside in the computer's main memory. The document object model representation is then subsequently manipulated by a program to provide dynamic content. Finally, the manipulated document object model representation is converted into HTML.

Figure 4:
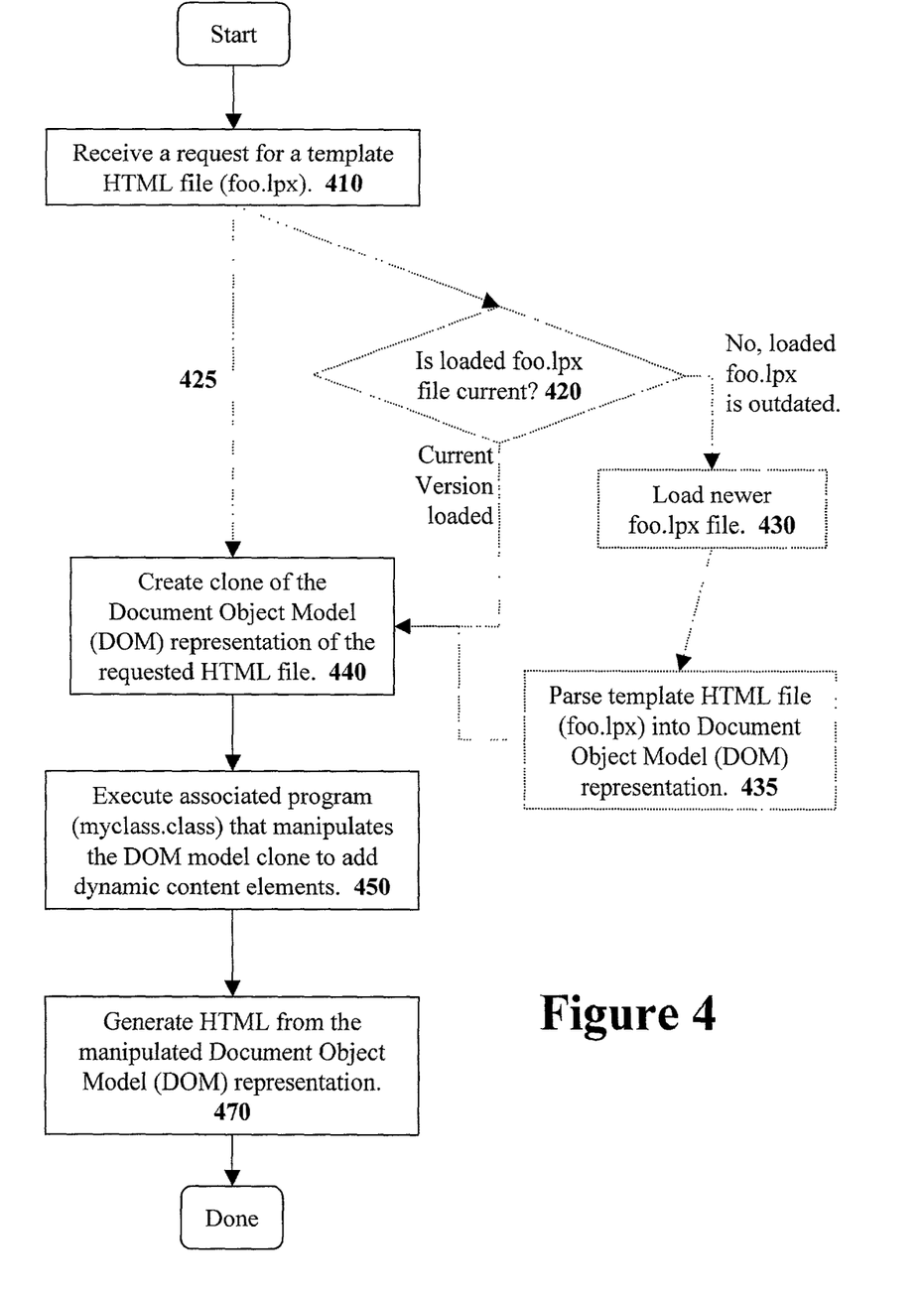
FIG. 4 illustrates a flow diagram describing the operation of one embodiment of an Internet server system constructed according to the teachings of the present invention.

FIG. 4 illustrates a flow diagram that describes how the server system program of the present invention operates. At step 410, the server system receives a request for the template web page design file (foo.lpx). The server system then begins to respond to the request. Two slightly different embodiments will be described with reference to FIG. 4. In a first embodiment wherein the server is always notified when template web page design files are deployed, the server system immediately proceeds along arrow 425 to processing step 440. In such an embodiment, the server system immediately creates a new document object model representation whenever it is given a new template HTML web page.

In an alternate embodiment that does not notify the server of updated template web page design files, the server system responds to the request for the template web page design HTML file by testing the currently loaded template file (foo.lpx) to determine if it is the most current version at step 420. If the most recent version is loaded, the system proceeds to step 440. If the template web page design file is not current, then server loads the newer foo.lpx file at step 430 and then parses the updated template web page design file into a Document Object Model (DOM) representation at step 435 before proceeding to step 440 to handle the request.

At step 440, the server system begins processing by creating a clone of the document object model representation of the requested template web page. The clone of the document object model representation can be manipulated without affecting the original document object model representation of the template HTML web page file (foo.lpx). Each element of the Document Object Model (DOM) representation that has a dynamic content identifier tag may be put into a hash table for quick reference. In one embodiment, the document object model representation "clones" may be pre-generated in the background, so that these in-memory representations are immediately available when needed. Thus, step 440 is not required in all implementations.

Next, at step 450, the server system executes the associated dynamic content program. The associated dynamic content program manipulates the document object model representation of the template HTML web page in order to provide the desired dynamic content. The dynamic content program may add new elements to the document object model representation, delete existing elements, or perform any other modification that is possible on the document object model representation. For example, the following lines of java code find the node having a dynamic content identifier "myrow" in the document object model representation and set that node to be text saying "This is my row.":

Node=findByID("myrow");
Note.setText("This is my row.");

In a preferred embodiment, each time the dynamic content program attempts to modify a particular section of a document object model representation that is identified with a specific dynamic content identifier, the dynamic content program first verifies that it can locate the specific dynamic content identifier. If that specific dynamic content identifier cannot be located, then the associated dynamic content manipulation is not performed. In this matter, if a particular dynamic content element is deleted from the template HTML web page file, then the associated dynamic content program code will not be used.

After the dynamic content program has made all the desired dynamic content modifications to the document object model representation, then the dynamic content program calls a routine to output HTML from the modified document object model representation at step 470.

Web Site Appearance Redesign

A key advantage of the dynamic web site development system of the present invention is that it allows a graphic artist to quickly an easily modify the design of a deployed dynamic web set with very little disruption to the operation of the dynamic web site. Thus, ecommerce sites that run their mission critical web sites on the Internet using the teachings of the present invention can be quickly and easily changed at any time with no disruption to the dynamic web site.

Figure 5:
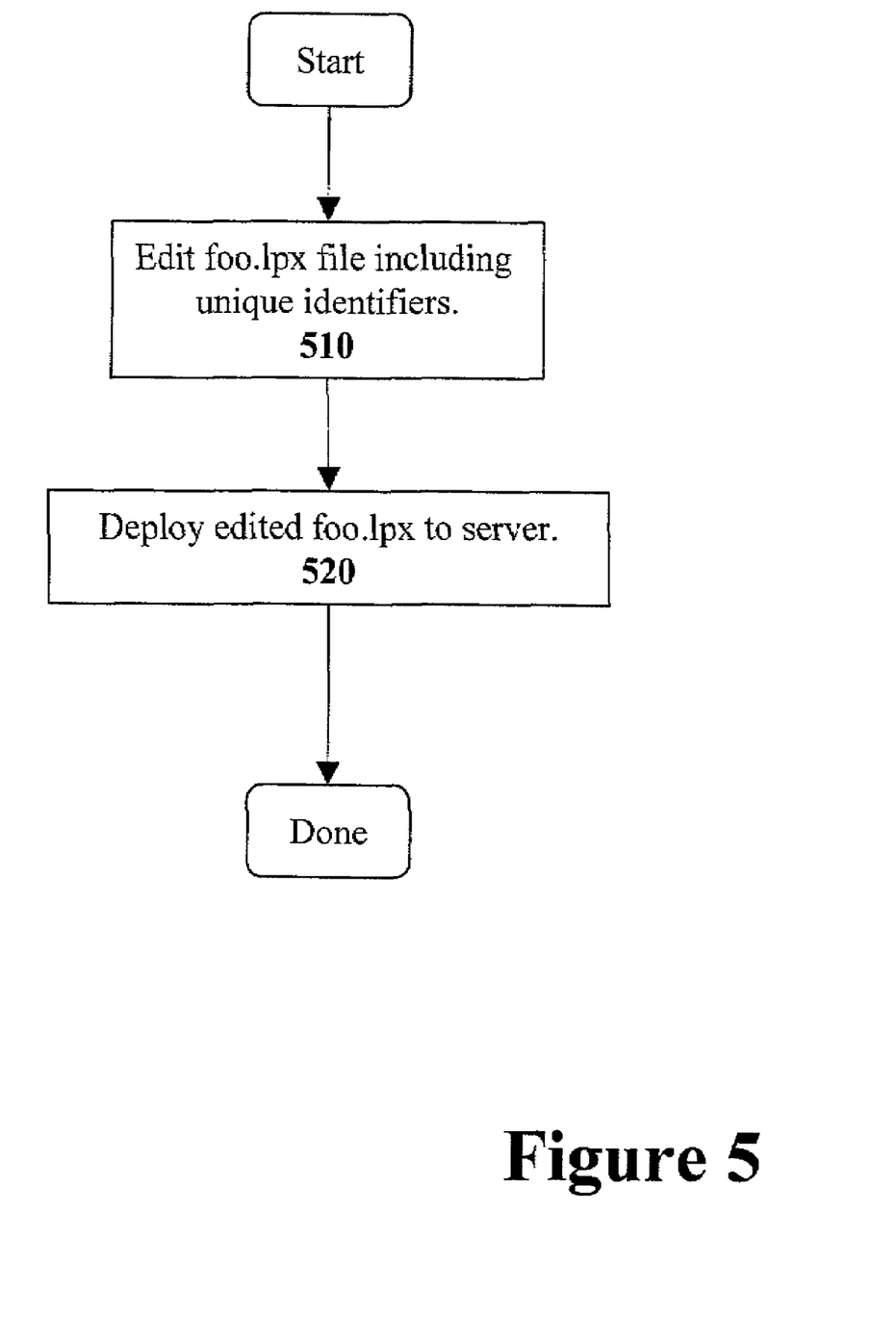
FIG. 5 illustrates a how the design of an interactive web site of the present invention may be easily modified.

FIG. 5 is a flow diagram that shows how simple it is for a graphic artist to modify the design of dynamic web site that uses the development system of the present invention. To modify the design of the dynamic web site, the graphic artist edits the template HTML web page design file with any available web page design tool at step 510. The web page designer may rearrange the design, add or remove images, change the template HTML web page design file, or even remove dynamic content portions as long as any interactive elements are supported by existing dynamic content program code. If the web page designer wishes to add a new dynamic content portion, then changes to the dynamic content program code would be needed.

After the web page designer modifies the template HTML web page design file, the web page designer then deploys the modified the template HTML web page design file to the server system that serves the dynamic web site at step 520.

Upon receiving the modified the template HTML web page design file, the server system will generate a new document object model representation. The two simple steps listed in FIG. 5 are all that is required to redesign the appearance of the dynamic web page built using the teachings of the present invention.

Figure 6:
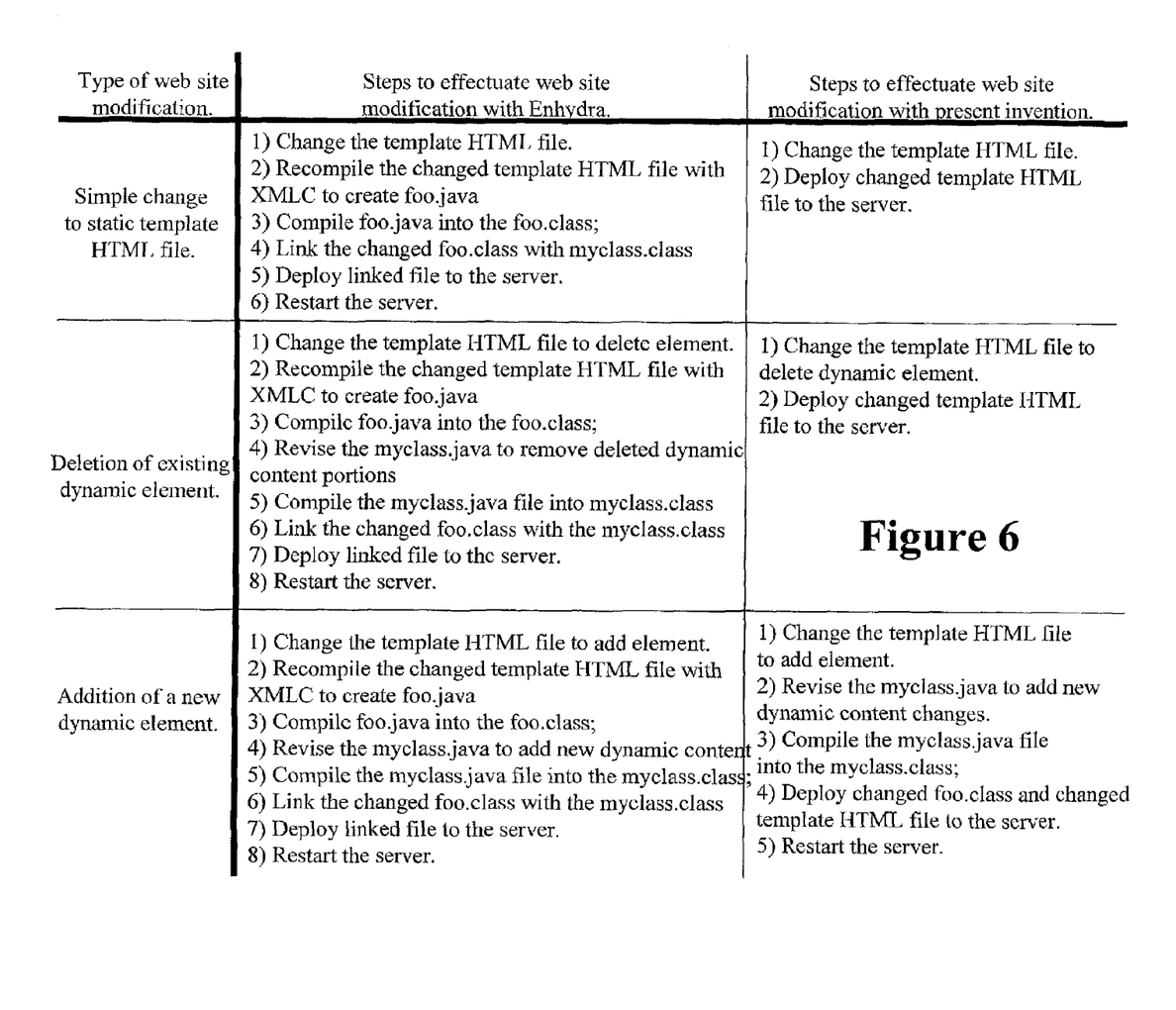
FIG. 6 illustrates a chart describing the procedures that must be performed for various changes to a web site developed with the Enhydra system and a web site developed with the teachings of the present invention.

FIG. 6 illustrates a chart that summarizes the various steps that must be performed to effectuate various different web site changes for both the Enhydra system and the system of the present invention. As set forth in the first row of FIG. 6, a simple change to the static template HTML web page design requires a large number of development steps for the Enhydra system. As previously set forth with reference to FIG. 5, the system of the present invention only requires two simple steps: the change to the static template HTML web page design and the deployment of that changed static template HTML web page.

Referring to the middle row of FIG. 6, if a dynamic element is deleted, the Enhydra system requires all the steps for when a simple change to the static template HTML web page design is made plus edits to the dynamic content program and a compilation of that dynamic content program. Thus, a simple deletion of a dynamic element requires that a programmer, a skilled professional, be involved even though only a simple design change was made. In stark contrast, the system of the present invention again only requires a simple change to the template HTML web page and a deployment of that static template HTML web page design to the server. Specifically, no programmer is involved such that it is easier to develop reusable components and sell those reusable components to organizations that do not need programmers to modify functionality.

Even when new dynamic content elements are created, the system of the present invention is easier to use than the Enhydra system. Referring to the final row of FIG. 6, when a new dynamic content element is added to the web site of an Enhydra based system, the long eight-step process must be performed. The system of the present invention eliminates the compilation and linking of the template HTML web page and thus has a simpler five step process.

Thus, using the teachings of the present invention, a dynamic web page can be quickly redesigned to accommodate any current event or promotion. For example, the appearance of a web page may be changed on the day of any holiday to match the theme of that day's holiday.

Development Using Preformatted Dynamic Web Page

The system of the present invention can be used to create many different types of dynamic web pages. However, many typical dynamic web pages have the same types of information. For example, many sites require a user to register by providing certain information about the user. Many web sites request a name and an email address. But not all sites that require a registration use the same information. For example, other sites may require a name, an email address, and a physical postal and address. To allow simple development of typical web sites, the present invention introduces the concept of default dynamic web pages.

A default dynamic web page is a web page that is designed for a particular use that contains every possible bit of information that may be needed for such a use. For example, a user registration page would request every type of information that any web site may require during a user registration. One implementation of a default dynamic web page for a registration page might request the user's first name, middle name, last name, address, phone number, social security number, email address, credit card, and any other piece of user information. Then, to create a specific registration page for a specific web site, a designer merely deletes the portions of the default dynamic web page for registrations that the designer does not wish to use. For example, if the desired web site does not require the user's social security number, then the designer can delete all the sections of the default dynamic web page related to the user's social security number. As set forth in the center row of FIG. 6, the deletion of a dynamic element doesn't require any additional changes except for deploying the modified web page to the server system.

By creating a set of different default dynamic web pages for different web page applications, the present invention can be used to quickly create a dynamic web site by simply deleting the undesired portions of the default dynamic web pages. Different types of default dynamic web pages could include user registration pages, confirmation pages, product purchase pages, purchase verification pages, account summary pages, account update pages, etc.

The foregoing has described methods for creating interactive web sites that are easy to modify. It is contemplated that changes and modifications may be made by one of ordinary skill in the art, to the materials and arrangements of elements of the present invention without departing from the scope of the invention.

I claim:

1. A method of serving web pages from a server, said method comprising:
   in response to a request from a client computer system over a network for accessing a Web page, the server retrieving an HTML (hypertext markup language) template associated with the requested Web page;
   creating a document object model (DOM) representation based on the HTML template, the DOM representation including a plurality of identifier tags, each identifier tag identifying a section in which content of the identified section is dynamically manipulable;
   executing a program associated with the HTML template to manipulate content identified by at least a portion of the plurality of identifier tags within the DOM representation including dynamically adding content to at least one section identified by one of the plurality of identifier tags, wherein the program is deployed with the HTML template to the server without having to compile and link the program with the HTML template;
   the program calling a routine to generate a markup language document based on the manipulated DOM representation; and
   returning said markup language document to said client computer system over the network.

2. The method of serving web pages as claimed in claim 1 further comprising:
   determining the retrieved HTML template is current, wherein the DOM representation is created based on a most current HTML template stored within the server.

3. The method of serving web pages as claimed in claim 2 further comprising:
   creating a new version of the HTML template if an existing HTML template is not current.

4. The method of serving web pages as claimed in claim 2 further comprising:
   automatically generating a new DOM representation if the HTML template is modified.

5. The method of serving web pages as claimed in claim 1 further comprising:
   determining a reference to first content to be added to a first section of the DOM representation identified by a first identifier tag by performing a hash operation between the first identifier with a predetermined hash table; and
   populating the first content into the first section identified by the first identifier tag based on the determined reference of the first content.

6. The method of serving web pages as claimed in claim 1 wherein said program comprises Java code compiled without compiling and linking with the HTML template, wherein the program and HTML template are capable of being independently deployed.

7. The method of serving web pages as claimed in claim 1 wherein said program that manipulates an in-memory representation of said requested web page file performs operations including:
   automatically generating a new DOM representation when the HTML template is modified; and
   generating a clone of the new DOM representation, wherein manipulation of content is performed on the clone without altering the new DOM representation.

8. The method of serving web pages as claimed in claim 1 wherein said program that manipulates the DOM representation performs operations including:
   locating an identifier of a dynamic element to change within the DOM representation; and
   changing said dynamic element in the DOM of the HTML template.

9. A method of serving web pages from a server, said method comprising:
   creating a modified mark-up language file for representing a web page appearance, said modified mark-up language file containing embedded identifier tags for identifying locations for dynamic content;
   creating an in-memory representation of the modified mark-up language file, the in-memory representation compatible with a document object model (DOM);
   creating interactive program functions for generating dynamic content, said interactive program functions for modifying sections of said in-memory representation of said mark-up language file associated with said identifier tags identifying locations for dynamic content; and
   deploying said modified mark-up language file and said interactive program functions to a server system without having to compile and linking the interactive program with the modified mark-up language file, wherein said server system executes said interactive program functions to manipulate said in-memory representation of said mark-up language file to create a manipulated in-memory representation of said mark-up language file, and generates a web page from said manipulated in-memory representation of said mark-up language file.

10. The method of serving web pages as claimed in claim 9 wherein said server system further determines if said modified mark-up language file is current.

11. The method of serving web pages as claimed in claim 10 wherein said server system creates a new in-memory representation of a new version of said modified mark-up language file if said modified mark-up language file is not current.

12. The method of serving web pages as claimed in claim 10 wherein said server system automatically generates a new in-memory representation of said modified mark-up language file when said modified mark-up language file is modified.

13. The method of serving web pages as claimed in claim 9 further comprising:
   determining a reference to first content to be added to a first section of the DOM representation identified by a first identifier tag by performing a hash operation between the first identifier with a predetermined harsh table; and
   populating the first content into the first section identified by the first identifier tag based on the determined reference of the first content.

14. The method of serving web pages as claimed in claim 9 wherein said interactive program functions comprise Java code.

15. The method of serving web pages as claimed in claim 9 wherein said interactive program functions perform operations including:
   automatically generating a new in-memory representation of said modified mark-up language file when said modified mark-up language file is modified; and
   generating a clone of said new in-memory representation of said modified mark-up language file.

16. The method of serving web pages as claimed in 9 wherein said interactive program functions perform operations including:
   locating an identifier of a dynamic element to change within said in-memory representation of said modified mark-up language file; and
   changing said dynamic element in said in-memory representation of said modified mark-up language file.

17. A computer server system for serving web pages, said computer server system comprising:
   a processor; and
   a memory coupled to the processor for storing instructions, when executed from the memory, cause the processor to perform operations including
      in response to a request from a client computer system over a network for accessing a Web page, the server retrieving an HTML (hypertext markup language) template associated with the requested Web page,
      creating a document object model (DOM) representation based on the HTML template, the DOM representation including a plurality of identifier tags, each identifier tag identifying a section in which content of the identified section is dynamically manipulable,
      executing a program associated with the HTML template to manipulate content identified by at least a portion of the plurality of identifier tags within the DOM representation including dynamically adding content to at least one section identified by one of the plurality of identifier tags, wherein the program is deployed with the HTML template to the server without having to compile and link the program with the HTML template,
      the program calling a routine to generate a markup language document based on the manipulated DOM representation, and
      returning said markup language document to said client computer system over the network.

18. A machine readable medium having instructions stored therein, when executed, cause a machine to perform a method, the method comprising:
   in response to a request from a client computer system over a network for accessing a Web page, the server retrieving an HTML (hypertext markup language) template associated with the requested Web page;
   creating a document object model (DOM) representation based on the HTML template, the DOM representation including a plurality of identifier tags, each identifier tag identifying a section in which content of the identified section is dynamically manipulable;
   executing a program associated with the HTML template to manipulate content identified by at least a portion of the plurality of identifier tags within the DOM representation including dynamically adding content to at least one section identified by one of the plurality of identifier tags, wherein the program is deployed with the HTML template to the server without having to compile and link the program with the HTML template;
   the program calling a routine to generate a markup language document based on the manipulated DOM representation; and
   returning said markup language document to said client computer system over the network.

19. The machine readable medium of claim 18, wherein the method further comprises:
   determining a reference to first content to be added to a first section of the DOM representation identified by a first identifier tag by performing a hash operation between the first identifier with a predetermined hash table; and
   populating the first content into the first section identified by the first identifier tag based on the determined reference of the first content.

* * * * *